United States Patent
Kirchgaessner et al.

(10) Patent No.: US 9,507,587 B2
(45) Date of Patent: Nov. 29, 2016

(54) APPLICATION-CENTRIC RESOURCES AND CONNECTIVITY CONFIGURATION

(75) Inventors: Walter Kirchgaessner, Bad Schoenborn (DE); Hristo Dobtchev, Sofia (BG); Lassen Minov, Sofia (BG); Dimitar Kostov, Sofia (BG)

(73) Assignee: SAP SE, Walldorf (DE)

( * ) Notice: Subject to any disclaimer, the term of this patent is extended or adjusted under 35 U.S.C. 154(b) by 961 days.

(21) Appl. No.: 12/494,809

(22) Filed: Jun. 30, 2009

(65) Prior Publication Data

US 2010/0333060 A1 Dec. 30, 2010

(51) Int. Cl.
  G06F 9/44 (2006.01)
  G06F 9/445 (2006.01)
  G06F 11/30 (2006.01)
  G06F 11/32 (2006.01)

(52) U.S. Cl.
  CPC . *G06F 8/71* (2013.01); *G06F 8/10* (2013.01); *G06F 8/61* (2013.01); *G06F 9/44536* (2013.01); *G06F 11/3017* (2013.01); *G06F 11/3055* (2013.01); *G06F 11/3072* (2013.01); *G06F 11/324* (2013.01)

(58) Field of Classification Search
  CPC .............. G06F 8/10; G06F 8/20; G06F 8/24; G06F 8/61; G06F 8/71; G06F 9/44536; G06F 11/3017; G06F 11/3055; G06F 11/3072; G06F 11/324; G06Q 10/06; G06Q 10/10
  USPC ................................. 717/102, 104, 105, 120
  See application file for complete search history.

(56) References Cited

U.S. PATENT DOCUMENTS

| | | | | |
|---|---|---|---|---|
| 5,819,042 A | * | 10/1998 | Hansen | 709/222 |
| 6,012,152 A | * | 1/2000 | Douik | G06F 11/0709 714/26 |
| 6,633,869 B1 | * | 10/2003 | Duparcmeur | G06F 17/30371 |
| 7,136,857 B2 | * | 11/2006 | Chen | G06F 8/60 |
| 7,259,666 B1 | * | 8/2007 | Hermsmeyer et al. | 340/517 |

(Continued)

OTHER PUBLICATIONS

Guijarro et al., "Framework for managing large scale component-based distributed applications using JMX," May 2002, last retrieved from http://citeseerx.ist.psu.edu/viewdoc/download?doi=10.1.1.75.2911&rep=rep1&type=pdf on Oct. 1, 2016.*

(Continued)

*Primary Examiner* — Wei Zhen
*Assistant Examiner* — Andrew M Lyons
(74) *Attorney, Agent, or Firm* — Schwegman Lundberg & Woessner, P.A.

(57) ABSTRACT

In various exemplary embodiments, a system and associated method to provide application-centric resource management of a plurality of functional units in an enterprise environment is disclosed. The system, in an exemplary embodiment, comprises a deploy service module to determine whether one or more of the plurality of functional units within the enterprise environment is added or removed, an information model repository to provide information related to the plurality of functional units, a functional unit container to store a listing of resource services related to the plurality of functional units, and a managed resources container to associate each of the plurality of functional units with one or more development components in the enterprise environment. A user-interface is configured to display non-technical management information relating to each of the plurality of functional units.

26 Claims, 9 Drawing Sheets

(56) References Cited

U.S. PATENT DOCUMENTS

| | | | |
|---|---|---|---|
| 7,536,290 B1* | 5/2009 | Browning et al. | 703/21 |
| 7,809,536 B1* | 10/2010 | Browning et al. | 703/6 |
| 7,849,472 B1* | 12/2010 | Fuchs | 719/328 |
| 7,979,245 B1* | 7/2011 | Bourlatchkov et al. | 703/2 |
| 8,078,357 B1* | 12/2011 | Trytten | G06F 8/20 700/245 |
| 8,132,189 B1* | 3/2012 | Fuchs | 719/328 |
| 2002/0019864 A1* | 2/2002 | Mayer | 709/223 |
| 2002/0083371 A1* | 6/2002 | Ramanathan et al. | 714/37 |
| 2003/0050932 A1* | 3/2003 | Pace | G06F 8/60 |
| 2004/0225952 A1* | 11/2004 | Brown | G06F 8/20 714/819 |
| 2005/0021348 A1* | 1/2005 | Chan | G06Q 10/067 706/45 |
| 2005/0171746 A1* | 8/2005 | Thalhammer-Reyero | G05B 17/02 703/2 |
| 2005/0216488 A1* | 9/2005 | Petrov et al. | 707/100 |
| 2006/0005124 A1* | 1/2006 | Speicher | 715/514 |
| 2006/0059253 A1* | 3/2006 | Goodman et al. | 709/223 |
| 2007/0294704 A1* | 12/2007 | Stephen | G06F 8/51 719/315 |

OTHER PUBLICATIONS

Clark, Larry and Joines, Stacy, "IBM WebSphere Developer Technical Journal: Monitoring an IBM WebSphere Extended Deployment environment," developerWorks Apr. 19, 2016, last retrieved from http://www.ibm.com/developerworks/websphere/techjournal/0604_joines/0604_joines.html on Oct. 1, 2016.*

"Application Monitoring: J2EE (Java 2 Enterprise Edition)", [Online]. Retreived from the Internet. <URL: http://www.nimsoft.com/solutions/application-monitoring/j2ee.php>, (Jun. 26, 2009), 3 pgs.

"Java Application Monitor API 2.6", [Online]. Retrieved from the Internet. <URL: http://linux.wareseeker.com/System/java-application-monitor-api-2.6.zip/332030>, (Jun. 4, 2007), 5 pgs.

"Monitoring and Diagnosing Production Applications Using Oracle Application Diagnostics for Java", [Online]. Retrieved from the Internet. <URL: http://www.oracle.com/technology/products/oem/pdf/wp_productionappdiagnostics.pdf>, (Dec. 2007), 6 pgs.

Hrasna, Hans, et al., "Managing and Monitoring Sun Java System Application Server 8.1", [Online]. Retrieved from the Internet. <URL: http://developers.sun.com/appsenter/reference/techart/mgmt_monitoring.html>, (Jun. 29, 2009), 13 pgs.

* cited by examiner

APPLICATION-CENTRIC RESOURCES AND CONNECTIVITY CONFIGURATION

TECHNICAL FIELD

The present application relates generally to the field of computer technology and, in a specific exemplary embodiment, to a system and method of allowing a non-technical user to readily determine whether applications and other functional components are running reliably on a server.

BACKGROUND

Today's Java®-based enterprise server consists of several thousand technical components that generate hundreds of thousands of data records. Each of the components and data records is capable of being monitored. In addition there are thousands of interdependencies between the components and data records. Once an application is deployed on the enterprise server, the application effectively disappears as a single entity. Technical parts of the application are intermixed with components of both the server and other applications. The intermixing makes monitoring an availability of an entire application an expensive and time-consuming process requiring significant knowledge about the specific server architecture and technical details of both the server and applications running thereon. The complexity also leads administrators to investigate multiple false alarms from unimportant or unused technical components. To make matters worse, the applications can be spread across multiple physical hosts in a server cluster.

Java® servers typically present a rich set of universal configuration tools to allow managing different aspects of the applications that run on the server. The universal configuration tools however impose a problem: from the many applications running on the server, only a few of the tools directly bring business value and are important for the administrator. Yet, to configure the important applications the administrator has to know and understand the generic tools. Alternatively, applications can provide their own, specific-configuration tools, but this increases the development cost of the application and can lead to having multiple non-coherent and non-standardized configuration tools.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
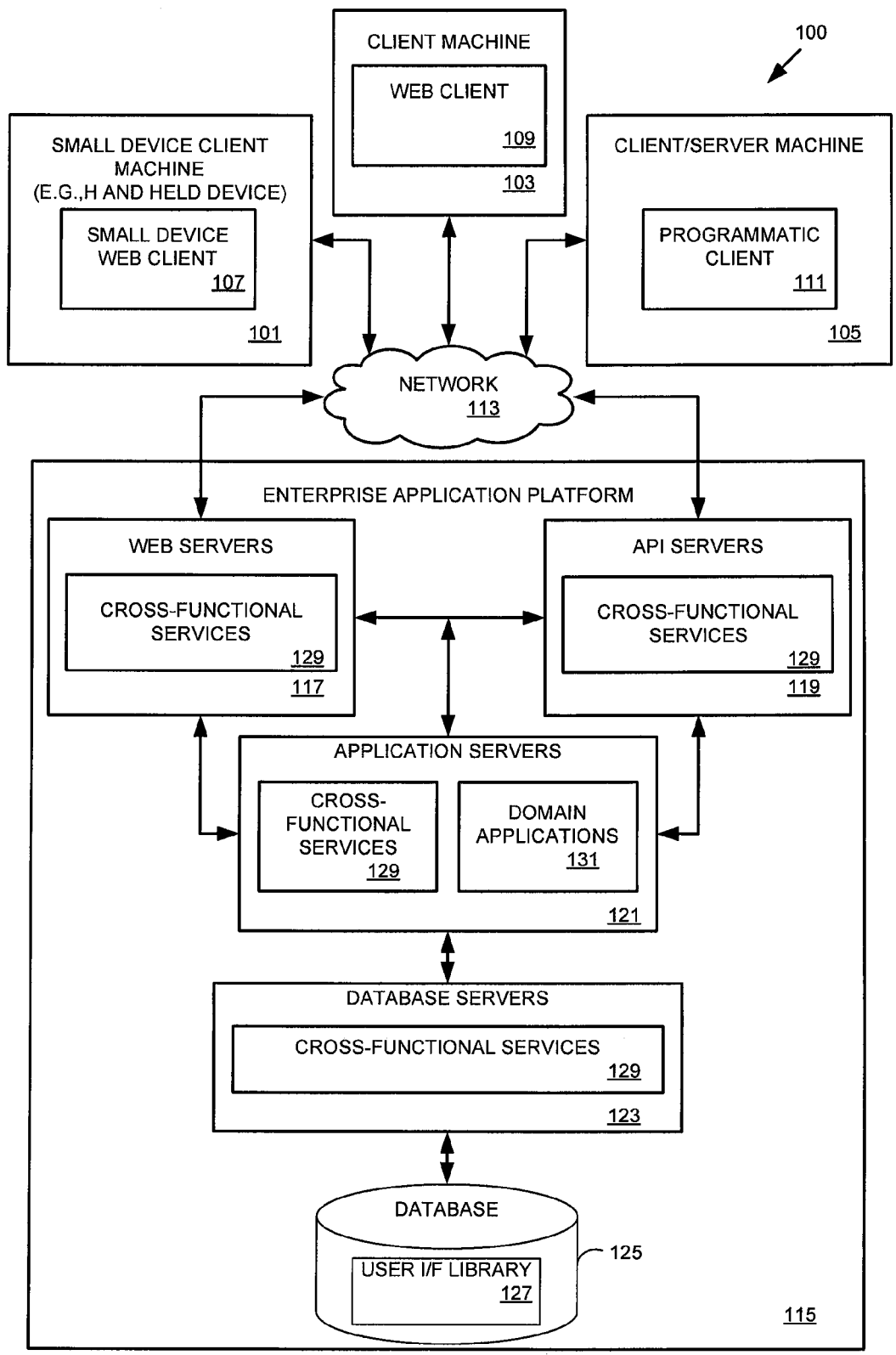
FIG. 1 is a high-level network diagram of an exemplary enterprise system including an enterprise application platform and a plurality of users of the platform.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on administration of Java-based servers and related environments, the embodiments are given merely for clarity in disclosure. Thus, any type of server environment, including various system architectures, may employ various embodiments of the application-centric resources system and method described herein and is considered as being within a scope of the present invention.

In an exemplary embodiment, a system to provide application-centric resource management to a non-technical user of various functional units in an enterprise environment is disclosed. The system includes a number of components including a deploy service module to determine whether one or more of the functional units within the enterprise environment exists, or is added or removed, an information model repository to provide information for each of the functional units, and a functional unit container to store a listing of resource services for the functional units. A managed resources container associates each of the functional units with one or more development components in the enterprise environment to allow the non-technical user to readily monitor and manage the functional units. A user-interface displays non-technical information relating to each of the functional units in, for example, an iconic form that the non-technical user can simply select. Controlling systems, including hardware or software as appropriate, is built into, for example, the Java® server. More complete details are provided herein.

An exemplary method can include determining whether one or more functional units exists within the enterprise environment, providing information related to the functional units, and storing a listing of resource services related to each of the functional units. The functional units are associated with one or more development components in the enterprise environment. A display allows a non-technical user to monitor and manage the functional units based on non-technical management information displayed. The user can simply select, for example, an icon to manage the functional units as is described below in more detail.

In another exemplary embodiment, a machine-readable storage medium including a plurality of instructions that, when executed by one or more processors, causes at least one of the one or more processors to perform a method, such as the one described above.

Overview of an Exemplary Enterprise-System—Adaptable to Inventive Features of Systems and Methods Described With reference now to FIG. 1, a network diagram depicts an exemplary enterprise-system 100 having a client-server architecture in an enterprise environment. The exemplary enterprise-system 100 includes a client machine 103 with a web client 109 (e.g., a browser, such as the INTERNET EXPLORER® browser developed by Microsoft® Corporation of Redmond, Wash., USA), a small device client machine 101 having a small device web client 107 (e.g., a browser without a script engine) and a client/server machine 105 with a programmatic client 111. Each of the client machines 101, 103, 105 is coupled to an enterprise application platform 115, which provides server-side functionality, via a network 113 (e.g., the Internet, an enterprise-based VPN, or a hard-wired enterprise connection) to one or more clients. The enterprise application platform 115 comprises a combination of, for example, machines, software, and firmware. The enterprise application platform 115 can be based upon an integrated technology software-platform such as, for example, SAP NetWeaver® (produced by SAP AG, Walldorf, Germany). Further, while the exemplary enterprise-system 100 of FIG. 1 employs a client-server architecture, inventive features of the present application are of course not limited to such an architecture, and could equally well find application in, for example, a distributed or peer-to-peer architecture system.

Turning specifically to the enterprise application platform 115, one or more web servers 117 and Application Program Interface (API) servers 119 are coupled to, and provide web and programmatic interfaces to, one or more application servers 121. The one or more application servers 121 are, in turn, coupled to one or more database servers 123 that facilitate access to one or more databases 125. The one or more databases can include a user interface library 127. The one or more web servers 117, API servers 119, application servers 121, and database servers 123 host a plurality of cross-functional service modules 129. The one or more application servers 121 further host a plurality of domain application modules 131.

The plurality of cross-functional service modules 129 provides services to both users and processes that utilize the enterprise application platform 115. For example, the plurality of cross-functional service modules 129 provides portal services (e.g., web services), database services, and connectivity to the plurality of domain application modules 131 for users that operate the client machine 103, the client/server machine 105, and the small device client machine 101. Additionally, the plurality of cross-functional service modules 129 provides an environment to deliver enhancements to existing applications and to integrate third party and legacy applications with existing ones of the plurality of cross-functional service modules 129 and the plurality of domain application modules 131.

Figure 2:
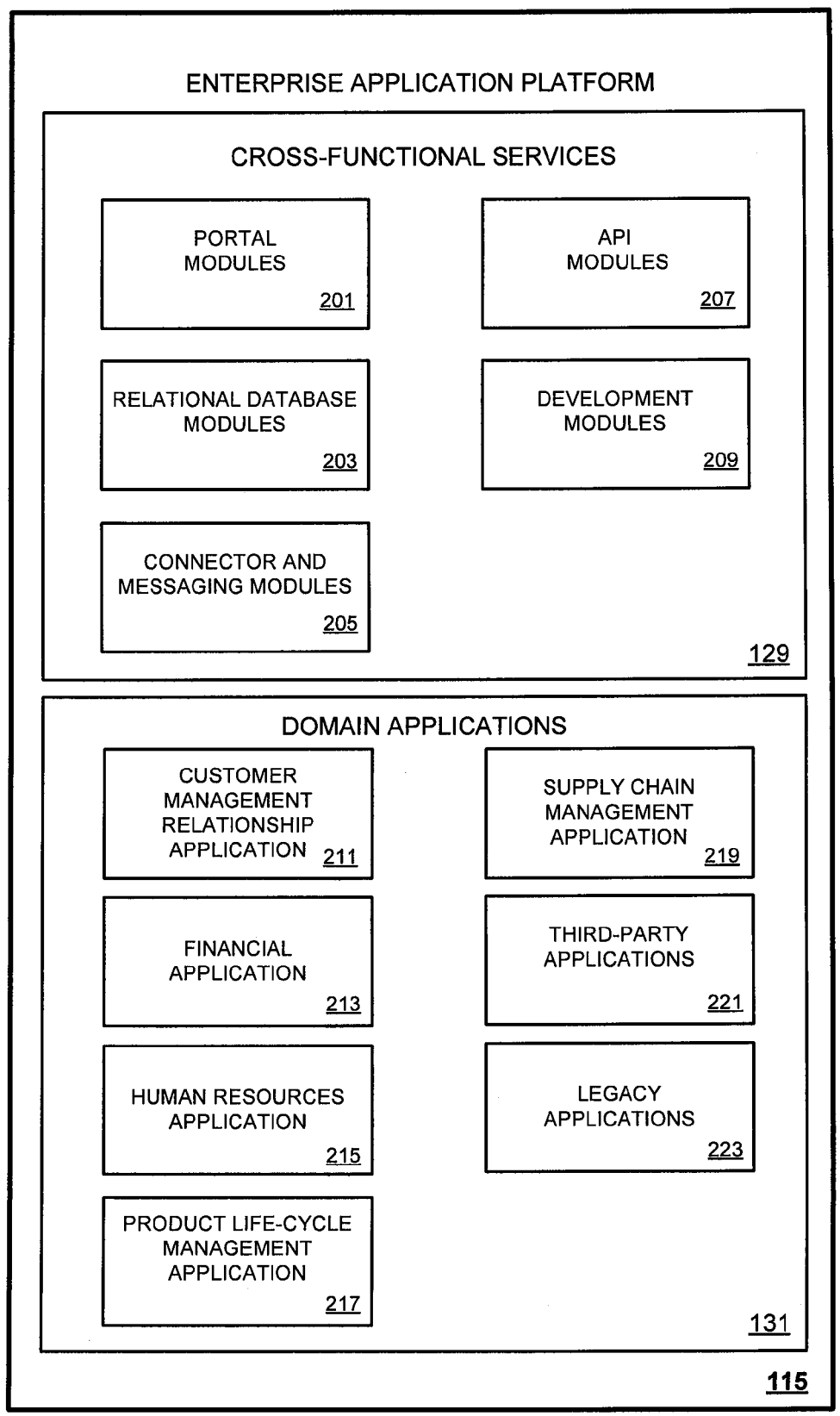
FIG. 2 is an exemplary block diagram of the enterprise application platform within the system of FIG. 1.

Referring now to FIG. 2, a block diagram of particular components within the exemplary enterprise-system 100 of FIG. 1 illustrates enterprise applications and services of the enterprise application platform 115. The enterprise application platform 115 includes the plurality of cross-functional service modules 129 and domain application modules 131. In a specific exemplary embodiment, the plurality of cross-functional service modules 129 each include portal modules 201, relational database modules 203, connector and messaging modules 205, API modules 207, and development modules 209. As will be recognizable to a skilled artisan, each of the modules can be implemented in hardware, software, or firmware.

The portal modules 201 enable a single point of access to another one of the plurality of cross-functional service modules 129 and domain application modules 131 for the client machine 103, the client/server machine 105, and the small device client machine 101. The portal modules 201 can process, author, and maintain web pages that present content (e.g., user interface elements and navigational controls) to the user. In addition, the portal modules 201 enable user roles, a construct that associates a role with a specialized environment utilized by a user to execute tasks, utilize services, and exchange information with other users and within a defined scope. For example, the role determines the content that is available to the user and the activities that the user may perform. The portal modules 201 can include a generation module, a communication module, a receiving module, and a regenerating module (albeit not shown explicitly). Further, the portal modules 201 comply with web services standards or utilize a variety of Internet technologies including Java, J2EE, Advanced Business Application Programming Language (ABAP) and Web Dynpro (both available from SAP AG, Walldorf, Germany), XML, JCA, JAAS, X.509, LDAP, WSDL, WSRR, SOAP, UDDI, and Microsoft® .NET (each known independently in the art).

The relational database modules 203 provide support services for access to the one or more databases 125 including the user interface library 127 (see FIG. 1). The relational database modules 203 provide support for object relational mapping, database independence, and distributed computing. The relational database modules 203 are utilized to add, delete, update, and manage database elements. In addition the relational database modules 203 comply with database standards or utilize a variety of database technologies including SQL, SQLDBC, Oracle, MySQL, Unicode, JDBC (each known independently in the art).

The connector and messaging modules 205 enable communication across different types of messaging systems utilized by the plurality of cross-functional service modules 129 and domain application modules 131 by providing a common messaging application processing interface. The connector and messaging modules 205 enable asynchronous communication on the enterprise application platform 115.

The API modules 207 enable development of service-based applications by exposing an interface to existing and new applications as services. Repositories are included in the platform as a central place to find available services when building applications.

The development modules 209 provide a development environment for the addition, integration, updating, and extension of software components on the enterprise application platform 115 without impacting existing ones of the plurality of cross-functional service modules 129 and domain application modules 131.

With continuing reference to FIG. 2 and turning now to the plurality of domain application modules 131, a customer relationship management application module 211 enables access to and facilitates collecting and storing of relevant personalized information from multiple data sources and business processes. For example, enterprise personnel that are tasked with developing a buyer into a long-term customer may utilize the customer relationship management application module 211 to provide assistance to the buyer throughout a customer engagement cycle.

Enterprise personnel may also utilize a financial application module 213, along with various business processes, to track and control financial transactions within the enterprise application platform 115. The financial application module 213 facilitates execution of operational, analytical, and collaborative tasks associated with financial management. Specifically, the financial application module 213 enables performance of tasks related to financial accountability, planning, forecasting, and managing the cost of finance.

A human resource application module 215 may be utilized by particular enterprise personnel and business processes to manage, deploy, and track all enterprise personnel or certain subsets thereof. Specifically, the human resource application module 215 enables the analysis of human resource issues and facilitates human resource decisions based on real-time information.

A product life-cycle management application module 217 enables management of a product throughout a life-cycle of the product. For example, the product life-cycle management application module 217 enables collaborative engineering, custom product development, project management, asset management, and quality management among business partners, both within and outside of the enterprise.

A supply chain management application module 219 enables monitoring of performances observed in supply chains. The supply chain management application module 219 facilitates adherence to production plans and on-time delivery of products and services.

A third party application module 221, as well as a legacy application module 223, can be integrated with the plurality of domain application modules 131 and utilize the plurality of cross-functional service modules 129 on the enterprise application platform 115. As will be recognizable to a skilled artisan and as discussed above, each of the various modules described herein can be implemented in hardware, software, or firmware.

Integration of the Application-Centric Resources and Connectivity Configuration into the Exemplary Enterprise System As noted above, administration and management of enterprise-based systems in general, and Java application servers in particular, requires significant technical knowledge from the administrators. The significant technical knowledge is a direct result of the complex architecture of the server and specific requirements of hundreds of technical components.

In an exemplary embodiment, a proposed solution groups technical entities of a Java® server including applications running on the server, underlying components, and monitoring and troubleshooting of content the applications generate into a plurality of hierarchical units. The hierarchical units begin with non-technical, user-understandable entities such as, for example, applications and functional units (FUNs) and progress through architectural and development components (DCs). Additionally, relationships between the monitoring and diagnostic data and corresponding grouping units can be embedded directly in the server software. The embedded software is therefore an application-centric resource providing a componentization of all technical entities on the server.

In addition, relationships between the monitoring and diagnostic data and the corresponding applications and related functionalities will be embedded into hardware, firmware, or software running on the Java® server. The embedded component, described in detail below, is the application-centric resource. A user views an application merely as a single entity; its hundreds of technical components will be hidden. By viewing the application as a single entity, a calculation of an aggregated availability status of an entire application can be determined. Consequently, by viewing the application as a single entity, instead of looking at possibly tens or hundreds of parameters and log entries, the user is presented with a single status indicator. Having this information embedded in the operational data of a server, the user is given a generic administration tool (e.g., an Application Manager) that simply presents a list of applications and corresponding configurable entities, and associates every configurable entity with a corresponding configuration tool.

Figure 3:
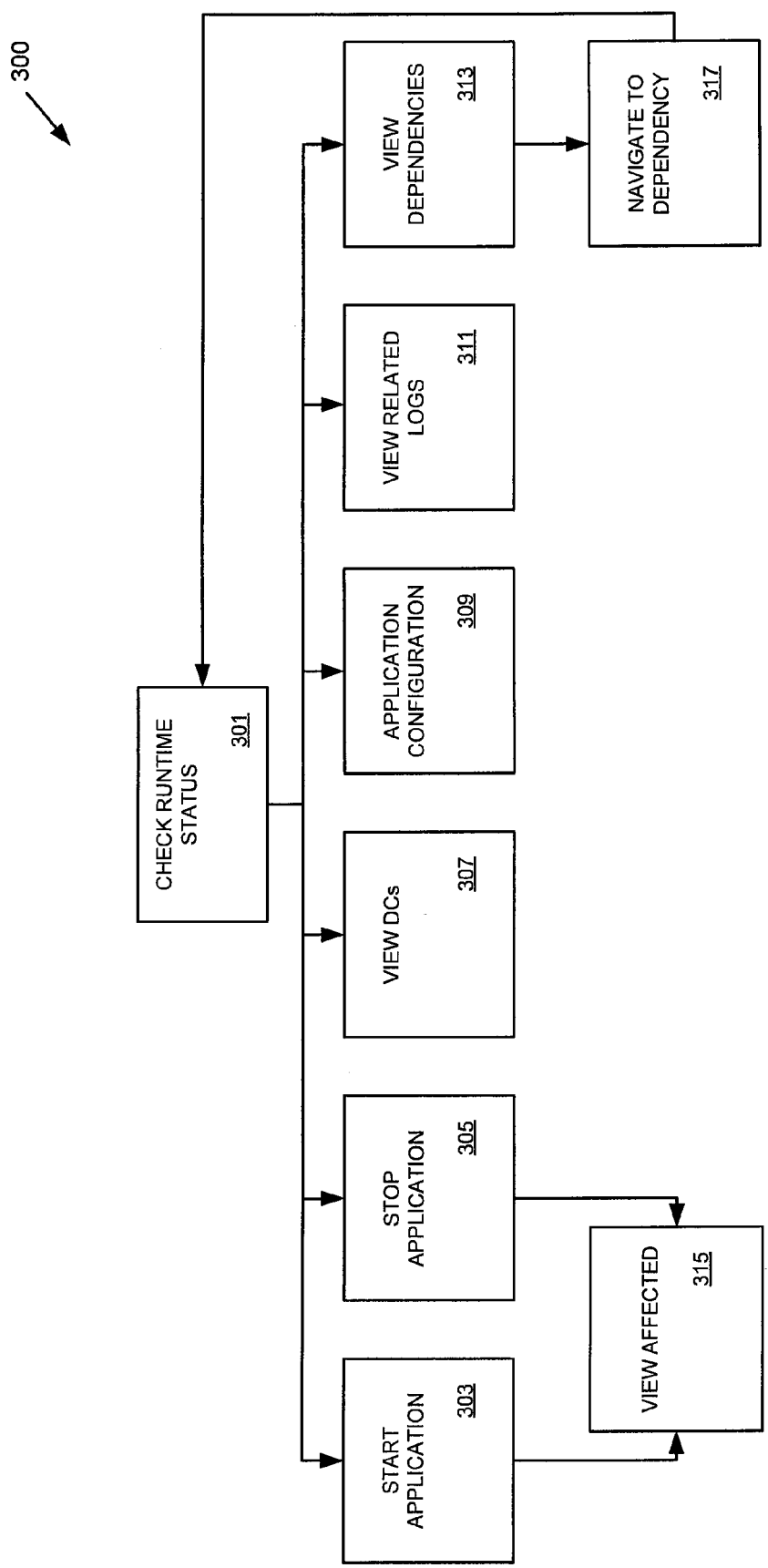
FIG. 3 is a block diagram illustrating an exemplary application of the application-centric resource.

For example, with reference to FIG. 3, an exemplary application of an application centric administration resource 300 provides an overview of a use of various inventive features of the system. The application-centric administration resource 300 describes relationships between various functional units (e.g., such as applications), their possible configurations such as connectivity, log and trace levels, properties, database resources, and so on. Thus, a generic administration tool, such as an application manager, can present a list of applications and their corresponding configurable entities and associate every configurable entity with a corresponding configuration tool. Each of these concepts is described in depth herein.

A user can check a runtime status option 301 of a particular application merely by looking at a graphical user interface (GUI) on a selection screen. (Neither the screen nor the GUI is shown but such graphical displays can take a variety of forms, such as icons representing the selection choices. Such graphical displays, including buttons and clickable links, are known independently in the art.) From the GUI, the user can select a plurality of components to check. The selection process can include selecting from a menu, by for example, keyboard, mouse, or touch-screen entry. The user will see a given application as a single entity. The hundreds of technical components either directly supporting or indirectly involved with the application are hidden.

If the runtime status option 301 indicates the application is not running, the user can select a start the application option 303 merely by selecting a component from the selection screen. Similarly, if the runtime status option 301 indicates the application is not running, the user can select a stop the application option 305 merely by selecting another component from the selection screen. (Of course, a skilled artisan will recognize that a start/stop selection option can simply be combined but the exemplary application of an application-centric administration resource 300 merely serves as an overview of the system.)

As an example of system and method functionality, when the user chooses to stop a functional unit (FUN), all development components (DCs) that belong to the FUN are processed (except for DCs used by other, still active FUNs). Additionally, all managed elements that are deployed with the DCs belonging to the FUN are found (e.g., JEE applications, J2EE applications, AS Java® services, etc.). Those managed elements are then stopped, thus completing the FUN "stop" operation. The mapping between DC and functional unit is many-to-many. In this way, there could be DCs that are not mapped to any functional unit. These DCs will still indirectly participate into runtime operations of the FUNs as there could be other DCs mapped to a functional unit that use these.

Therefore, once the application has been started or stopped, the user can optionally select a view affected option 315 indicating other applications or components that may be affected by starting or stopping the given application. For example, before actually stopping a first FUN, a user can be presented with a list of all dependent FUNs, along with any dependency hierarchies which will also be stopped as a result of the action on the first FUN. The user can further be given an option to cancel the stop action.

Consequently, the exemplary application of an application-centric administration resource 300 provides a hierarchical system that can simply provide a high-level overview of any given application running on the server or it can be used to provide additional depth into other interrelationships of components within the server. Thus, should a problem occur, the hierarchy and the dependencies will be used to drill-down to a possible root cause of the problem. Various arrangements of the hierarchy and the dependencies are discussed in detail, below.

From the runtime status option 301, the user can also choose a view Development Components (DCs) option 307. The view DCs option 307 allows the user to view underlying DCs either supporting or related to the given application. The interrelationships between applications and DCs are discussed in more detail with reference to FIG. 4, below.

Additionally, from the runtime status option 301, the user can also choose an application configuration option 309 or a view related logs option 311. The application configuration option 309 is described in detail, below. The view related logs option 311 allows the user to select, for example, a graphical or textual display of an overview of relevant data to the user in a non-technical format. Grouping and data correlation between the application and related components within the application-centric administration resource 300 allows automatic filtering-out of the relevant log and trace data, thus significantly reducing the volume of data to be analyzed. For example, an application server (e.g., such as the one or more application servers 121 of FIG. 1) can include certain "correlators" in its records to correlate an application to its related components. This correlation helps provide an application-centric presentation or format to the user. Grouping and data correlation and presentation techniques are known independently in the art.

Thus, the view DCs option 307, the application configuration option 309, and the view related logs option 311 each allow the user to drill-down to another level in the overall enterprise system. Consequently, the user can simply receive an overall status check on one or more applications by checking the runtime status option 301. Alternatively, the user can drill-down to various levels but only as needed to discern additional information. Regardless of the depth to which the user selects to view operations of the Examiner enterprise system however, there is no need for the user to possess any technical hardware, software, or architectural expertise to determine a system status.

From the runtime status option 301, the user can also choose a view dependencies option 313 allowing the user to view an overview of components upon which the application depends or interrelates. From the view dependencies option 313, the user can also choose to navigate directly to any one or more of the underlying dependent components by selecting a navigate to dependency option 317. Once the user has navigated to the any one or more of the underlying dependent components, the user can return directly to the runtime status option 301.

Overall, the application-centric administration resource 300 allows the user to view an aggregated state of an entire FUN without a need to check any of its dependencies and individual elements. Thus, the user can identify any problematic FUNs with minimal effort simply by referring to, for example, a simple graphical user interface. Therefore, if the aggregated state shows there is a problem with a particular FUN, the sub-hierarchy of that FUN can be expanded one or more levels down. Thus, the problematic FUN will have a "problem chain" automatically expanded.

Additionally, given a DC name, the user can determine one or more functional units to which the DC belongs. This capability is useful since many application user notes refer to DC names rather than functionalities.

By viewing the aggregated state details, especially in the case of reported problems, the user can directly see what problems are reported for the FUN as a result of the aggregation, as well as the concrete operational state and the cause for the state. Therefore, if a dependency has failed to initialize or is missing the details for the FUN, an operational state of "Enabled-Initialization Errors" can be displayed. If concrete errors are reported in the logs, a statement of "Errors Reported" can also be displayed.

As a result, the user can view a list of top level FUNs with their associated aggregated state. Should any of the FUNs have a potential problem, the user can proceed by drilling down into the details and dependencies for one or more FUNs thus allowing a non-technical user to manage an entire enterprise environment. Currently, a similar task under the prior art involves looking at a list of, for example, approximately 2000 DCs, and potentially browsing a large number of long records and logs, many of which are meaningless to the non-technical or casual user. However, using exemplary embodiments of the application-centric administration resource and system described herein, the list of FUNs may typically be only approximately 100 DCs in an average enterprise environment and an analysis of related log files is automatic. Additionally, the FUNs can be hierarchically organized. Thus, the top-level may contain only approximately 20 elements.

Consequently, in a specific exemplary embodiment of the application-centric administration resource 300, the user can see a complete list of FUNs on the system, together with their aggregated state including information such as vendor or revision number. The user can then control a level down to which the hierarchy is displayed in the list by expanding or collapsing branches or specifying that only a certain number of top levels be shown.

Additionally, the user can filter for any of the one or more FUNs that have reported problems. The user can also exclude entire FUNs and DCs as well as individual errors from the state calculation and error reporting scheme, thus allowing for reduced reporting "noise."

The user is also able to clearly distinguish an application afflicted with one or more problems from an application that is running normally. If an application is not functioning correctly, each of the drill-down options, discussed above, allows the user to determine which component or components can be a root cause of an application problem. As the user drills-down, any malfunctioning or failed components will be flagged (not shown).

As an additional example, in a specific exemplary embodiment, if either an application or a component is not operating in a normal state, the application or component can be checked with a yellow flag as behaving improperly, or a red flag indicating a complete failure of the application or an underlying component. Means for determining the operational state of various types of software or hardware components are known independently in the art. Once the underlying problem component is identified, the user can simply select the improperly operating component and the proper tool for resolving the issue is automatically proposed.

The user can start the tool simply by selecting it and the problem context is then passed to the tool.

Figure 4:
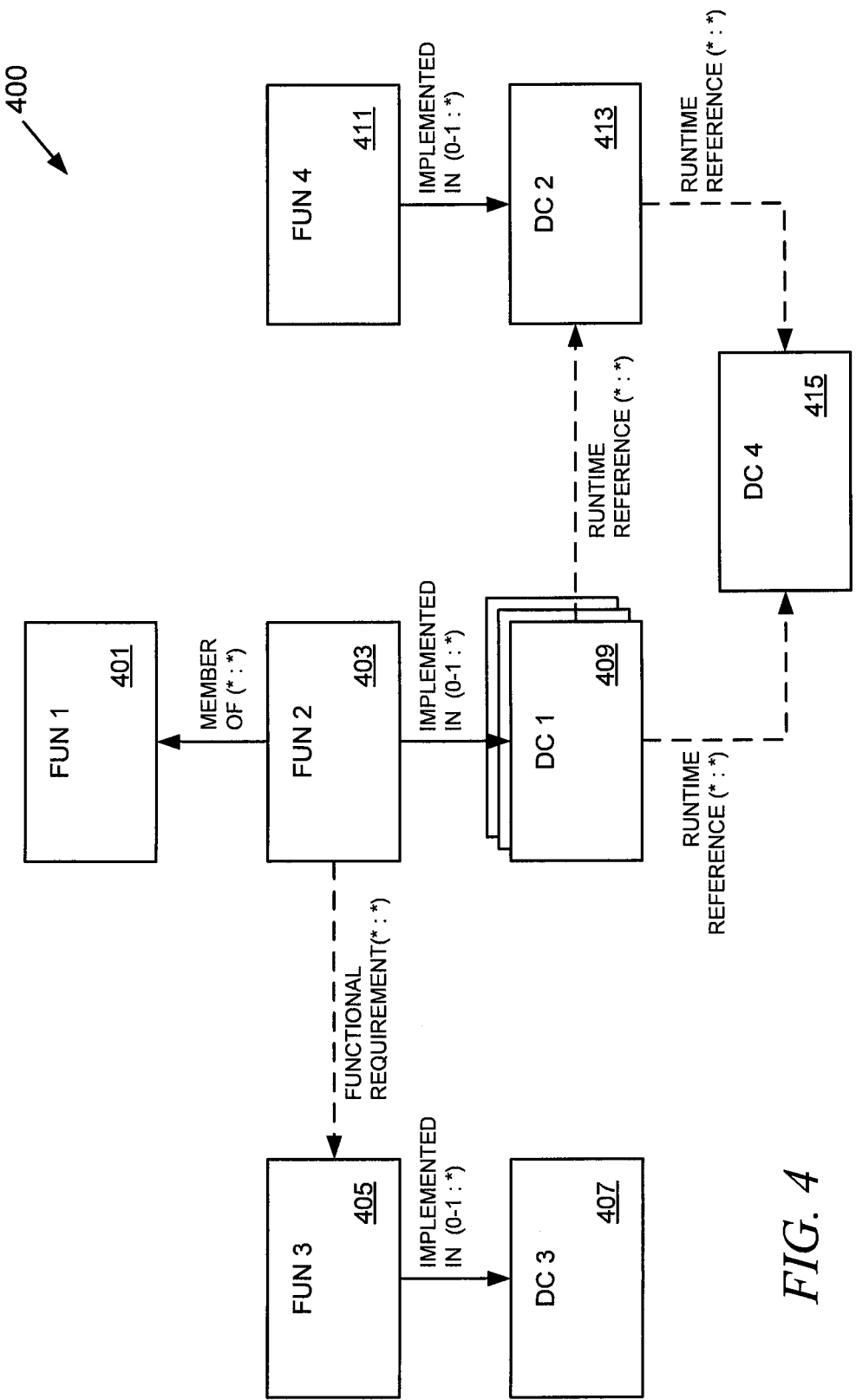
FIG. 4 is a block diagram illustrating exemplary relationships between various elements configured within the application-centric resource of FIG. 3.

Referring now to FIG. 4, an exemplary relationship block diagram 400 illustrates various direct and indirect relationships between various elements configured within the application-centric resource of FIG. 3. The exemplary relationship block diagram 400 thereby describes a plurality of relationships between different elements involved in operations involving an enterprise system. For example, as briefly described above, relationships between functional units (FUNs) are defined by various sources. The FUNs describe one or more user-understandable functionalities of various components, such as an application, running on the enterprise system. However, the FUNs are not limited to applications. The FUNs can describe an entire product through a portion of the product (e.g., an application) to part of a product or application such as a user-interface associated with an application.

Relationships between the FUNs and DCs can be described by, for example, a common information model (CIM) standard, known independently in the art. The CIM standard defines how managed components in an enterprise system are represented as a common set of objects along with relationships between the objects. CIM serves as a basis for most of the other distributed management task force (DMTF) standards such as web-based enterprise management (WBEM) and systems management architecture for server hardware (SMASH). Relationships between FUNs and DCs can also be determined in models such as SAP EDEN (produced by SAP AG, Walldorf, Germany). Runtime references between DCs can be defined by the DC in the development environment to use functionalities implemented in another DC. Such definitional reference techniques are known independently in the art.

With continuing reference to FIG. 4, the exemplary relationship block diagram 400 defines a specific exemplary embodiment of a relationship structure between various FUNs and (development components) DCs, thereby providing an overview of a plurality of dependencies that may be directly viewed from the application-centric administration resource 300 of FIG. 3. The exemplary relationship block diagram 400 includes a second FUN 403 that is implemented in, or a member of a first FUN 401. The second FUN 403 implements a first DC 409 and has a functional requirement to a third FUN 405. The third FUN 405, in turn, implements a third DC 407. The first DC 409 has a runtime reference to two additional DCs: a second DC 413 and a fourth DC 415. Thus, as understood by a skilled artisan, the runtime references can be configured to be viewed in the application-centric administration resource 300 only at runtime of a given application or, alternatively, can be configured to be viewed at any time. A fourth FUN 411 implements the second DC 413, resulting in an indirect relationship between the second FUN 403 and the fourth FUN 411 exists through the second DC 413. The mapping of a DC to a FUN may be accomplished during build time using, for example, the NetWeaver® developer studio plug-ins (produced by SAP AG, Walldorf, Germany).

As will be recognizable to a skilled artisan based on the above-description, runtime references between DCs are commonly defined by a developer of the DC in a development environment to use functionalities implemented in another DC. Thus, an "implemented in" relationship between a FUN and one or more DCs is introduced for administration of the application-centric resource. The relationship expresses that, for example, a functionality "X" is realized by a DC "Y." Thus, the DC "Y" is essential to the functionality "Y" for proper operation.

Figure 5A:
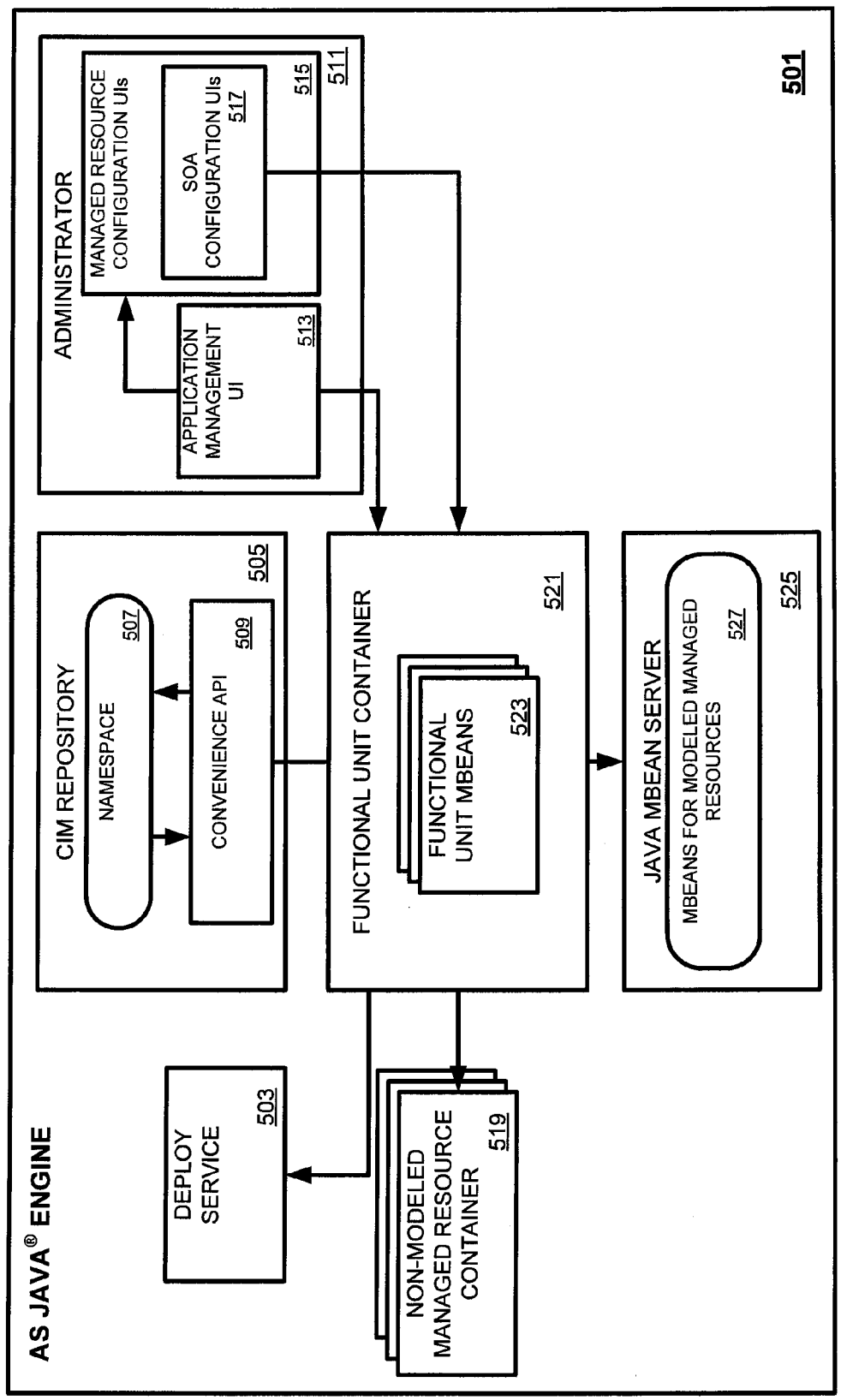
FIG. 5A is a block diagram of a specific exemplary embodiment of the application-centric resource applied to an application server (AS) Java® engine in an overview of an architectural model.

Referring now to FIG. 5A, an exemplary architectural model into which the application-centric administration resource 300 of FIG. 3 can be deployed includes an application server (AS) Java® engine 501. In a specific exemplary embodiment, the AS Java® engine 501 is an SAP NetWeaver® (produced by SAP AG, Walldorf, Germany) application server.

The AS Java® engine 501 includes a CIM repository 505, a functional unit container 521, and a Java® managed bean (MBean) server 525. The functional unit container 521 is coupled to a deploy service module 503 and a non-modeled managed resource container 519. An administrator module 511 is coupled to all components indirectly through the functional unit container 521.

The functional unit container 521 is built as a component of an AS Java® service and, as such, becomes an integral part of the AS Java® core. The functional unit container 521 reads information for existing FUNs from the CIM repository 505. The functional unit container 521 stores the information for the existing FUNs in a functional unit MBeans module 523. MBeans that represent the functional units are registered with the Java® Mbean server 525 and are stored in an Mbean modeled and managed resources container 527. Additionally, the functional unit container 521 processes events coming from the deploy service module 503. Consequently, any added or removed functional units, which are serviced by the deploy service module 503, can be either registered or un-registered through addition or removal of the appropriate MBeans.

The functional unit container 521 utilizes a convenience application programming interface (API) 509 within the CIM repository 505 to make a determination whether a functional unit is installed or not. The convenience API 509 is coupled to a namespace container 507. The namespace container 507 is generally a run-time container within the CIM repository 505 that can contain, for example, CIM classes, instances, and qualifier declarations.

Any operations performed within the AS Java® engine 501 can only be executed on an installed functional unit. The installed functional unit may or may not be configured. A configured functional unit may require different administration than a functional unit not yet configured. Thus, information pertaining to whether a functional unit is configured or not is retrieved from the CIM repository 505 and is retained in the functional unit MBeans module 523. Mbeans within the functional unit Mbeans module 523 have relations to Mbeans within the mbeans represented in the modeled and managed resources container 527 of the Java® MBean server 525. These relations can be utilized when an operation performed on a functional unit is executed (e.g., start/stop, configure, etc.). These relations are built based on the information arriving with every development component (DC). However, a deployment of a description of a functional unit does not necessarily mean that there are related DCs.

For managed resources that are not modeled within the CIM repository 505, a need can still exist to communicate directly to the container of the resource to map it to a proper functional unit and to execute operations on it (e.g., such as log configuration, log viewing, etc.). Thus, this resource type is contained within the non-modeled managed resource container 519. A skilled artisan will independently recognize that a plug-in can be provided within the AS Java® engine 501 to use introduced functional unit MBeans and display the MBeans to the user in an application management user-interface (UI) 513. All the operations performed by the user in the application management UI 513 can be executed on the functional unit MBeans. Additionally, the application management UI 513 can be constructed with links to one or more existing managed resource configuration UIs 515. Configuration of the managed resources assigned to a functional unit can be delegated to the one or more existing managed resource configuration UIs 515 by passing the needed context information.

Additionally, one or more service-oriented architecture (SOA) configuration UIs 517 can adopt concepts of the functional units and directly use the functional unit MBeans. Based upon the description provided herein, a skilled artisan will recognize that extensions to low-level MBeans and any AS engine UIs can be made such that the MBeans know about the functional units to which they are related.

Figure 5B:
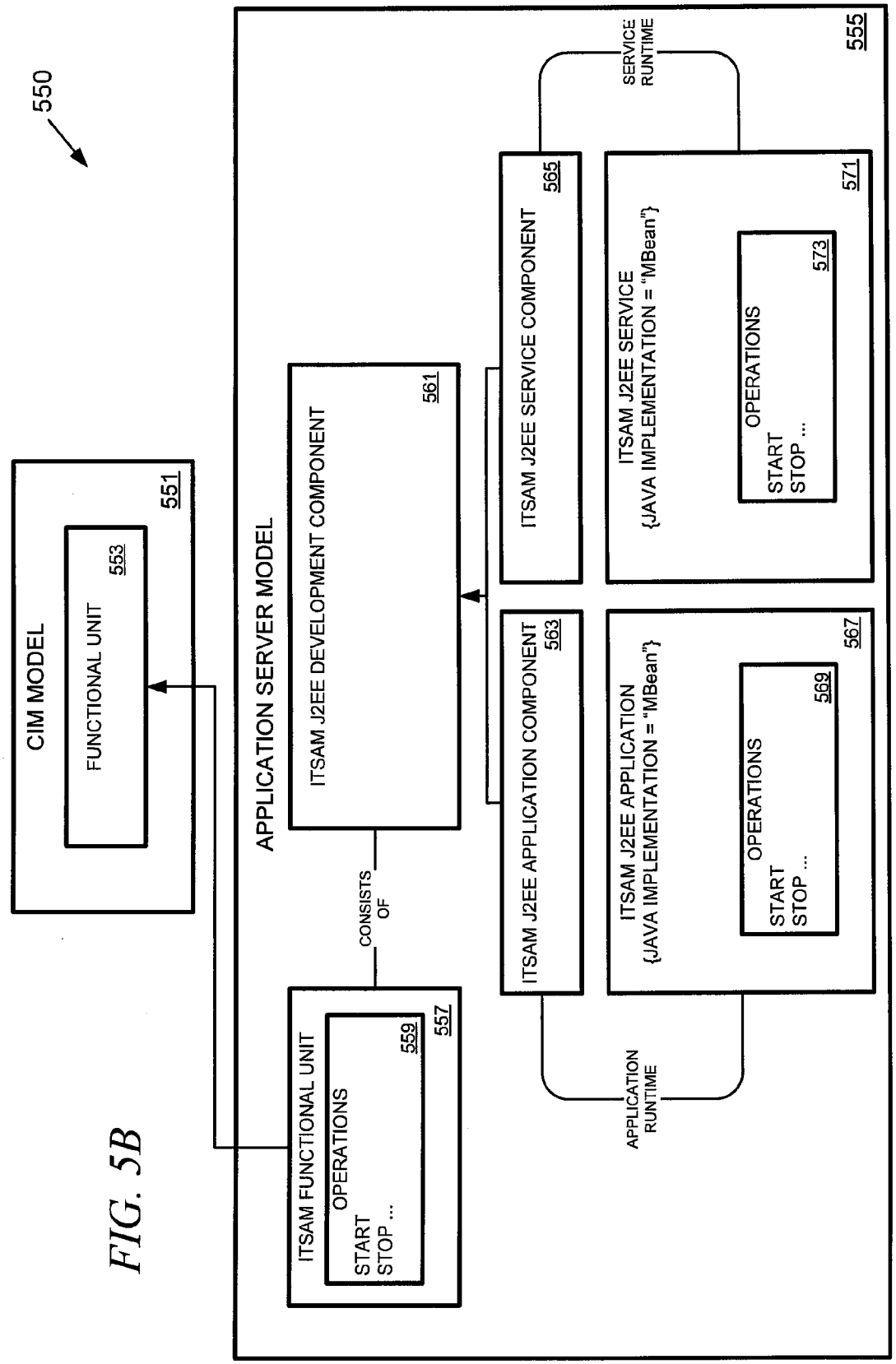
FIG. 5B is a block diagram of a specific exemplary embodiment of mapping relationships of various elements within the architectural model of FIG. 5A.

Referring now to FIG. 5B, a block diagram 550 of a specific exemplary embodiment of mapping relationships of various elements within the architectural model of FIG. 5A is illustrated. The block diagram 550 defines exemplary relationships between a functional unit 553 and its various components. The block diagram 550 includes a CIM model 551 and an application server model 555. The CIM model 551, in this exemplary embodiment, includes the functional unit 553. The CIM model 551 can be based on either the CIM or EDEN models, discussed above. The application server model 555 can be, for example, be the AS Java® engine 501 discussed above, or any other application server.

To illustrate mapping relationships, the application server model 555 includes a specific example of a particular type of functional unit, an information technology support for asset management (ITSAM) functional unit 557. (Generic ITSAM applications are known independently in the art.) The ITSAM functional unit 557 includes an operations block 559 defining operations such as start, stop, and so on. The ITSAM functional unit 557 consists of an ITSAM J2EE development component 561. Underlying the ITSAM J2EE development component 561 is an ITSAM J2EE application component 563 and an ITSAM J2EE service component 565. The ITSAM J2EE application component 563 and the ITSAM J2EE service component 565 have application runtime and service runtime to an ITSAM J2EE application 567 and an ITSAM J2EE service 571, respectively (each having an MBean implementation). Additionally, the ITSAM J2EE application 567 and the ITSAM J2EE service 571 each include an operations block 569, 573 defining operations such as start, stop, and so on for each component.

Thus, as an example, by employing the application-centric administration resource 300 (FIG. 3), execution of an operation (e.g., a start operation) on the functional unit 553 can be divided into a plurality of steps. Based on relations built into the CIM model 551, all functional units that are affected by the operation can be readily found. The affected functional units each have one or more managed objects or technical components (e.g., such as DCs) associated therewith. Relationships between the affected functional units, the one or more managed objects or technical components associated with the affected functional units, and the functional unit 553 can then be readily matched to each other. As a result of all affected functional units being mapped, one to another, once the operation is executed on the functional unit 553, any affected functional units can also be displayed to the user through the application-centric administration resource 300.

Consequently, the block diagram 550 illustrates, in this specific exemplary embodiment, how the functional unit 553 is mapped with a plurality of underlying DCs, other technical components, and other affected functional units. Thus, the user employing the application-centric administration resource 300 (FIG. 3) need only view, at a top-level, the functional unit 553. However, with concurrent reference to FIGS. 3 and 4, a skilled artisan can appreciate that the user can still drill-down directly to all DCs and any technical components associated with the functional unit 553 since all units have been mapped, one to another.

Figure 5C:
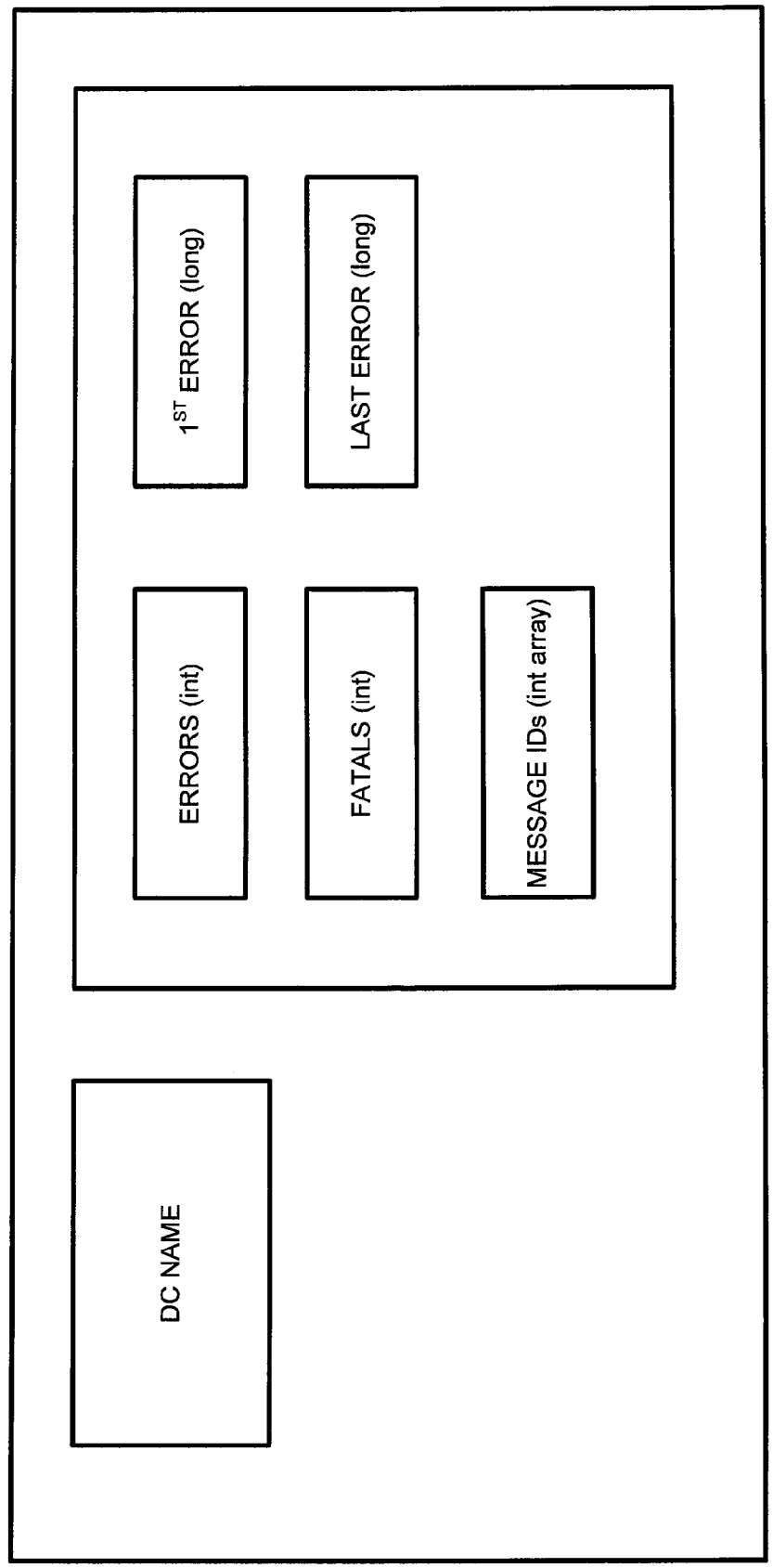
FIG. 5C is a exemplary table for storing a current state of one of the various elements of FIG. 5C.

With concurrent reference to FIGS. 5A, 5B, and now FIG. 5C, an exemplary table 590 to store a current state of a DC retrieved from the log content on the application server is illustrated. In a specific exemplary embodiment, a description of one of the functional unit Mbeans 523 to be used to retrieve a state of the DC based on the log content can be implemented by the following code, recognizable to a skilled artisan. A resulting version of the exemplary table 590 for each of the DCs can be stored in, for example, the functional unit container 521.

Description of Mbean with have to be used to retrieve the state of DCs based on log content:

```
public interface DCLogContentMBean {
/**
* List all available DCs which have a status provided by logs
* @return
*/
public String[ ] listDCs( );
/**
* Provides if the given DC is initialized normal( without warnings)
* @param dcName
* @return
*/
public boolean isFailToInitialize(String dcName);
/**
* Gives a number of FATAL errors reported by this DC
* @param dcName
* @return
*/
public int getNumberOfFatals(String dcName);
/**
* Gives a number of errors reported by this DC
* @param dcName
* @return
*/
public int getNumberOfErrors(String dcName);
/**
* provides time of last error reported
* @param dcName
* @return
*/
public long getLastErrorTimestamp(String dcName);
/**
* provides time of first error reported
* @param dcName
* @return
*/
public long getFirstErrorTimestamp(String dcName);
/**
* Removing given DC from status table
* @param dcName
*/
public void clearState(String dcName);
/**
* Provides list of LogRecord IDs related with given DC
* @param dcName
* @return
*/
public String[ ] getMessageIDs(String dcName);
/**
* Reinitialize the list of message IDs related with initialization
of servlet.
* if file named "HttpMessageIDCodes.properties" in server directory
exist the * info will be get from this file otherwise the predefined set
of message IDs
* will be.
*/
```

```
public void reInit( );
/**
* for given list with DC Names returns an array of DC states
* @see DCState class.
* @param dcNames
* @return
*/
public DCState[ ] getStates(String[ ] dcNames);
/**
* Starts the pop Thread if it is not started. Seems to have a
problem with that.
* Restart the monitor service if it is nesccessary .
* @TODO Evaluate the behavior
*/
public void startPoping( );
}
```

Figure 6:
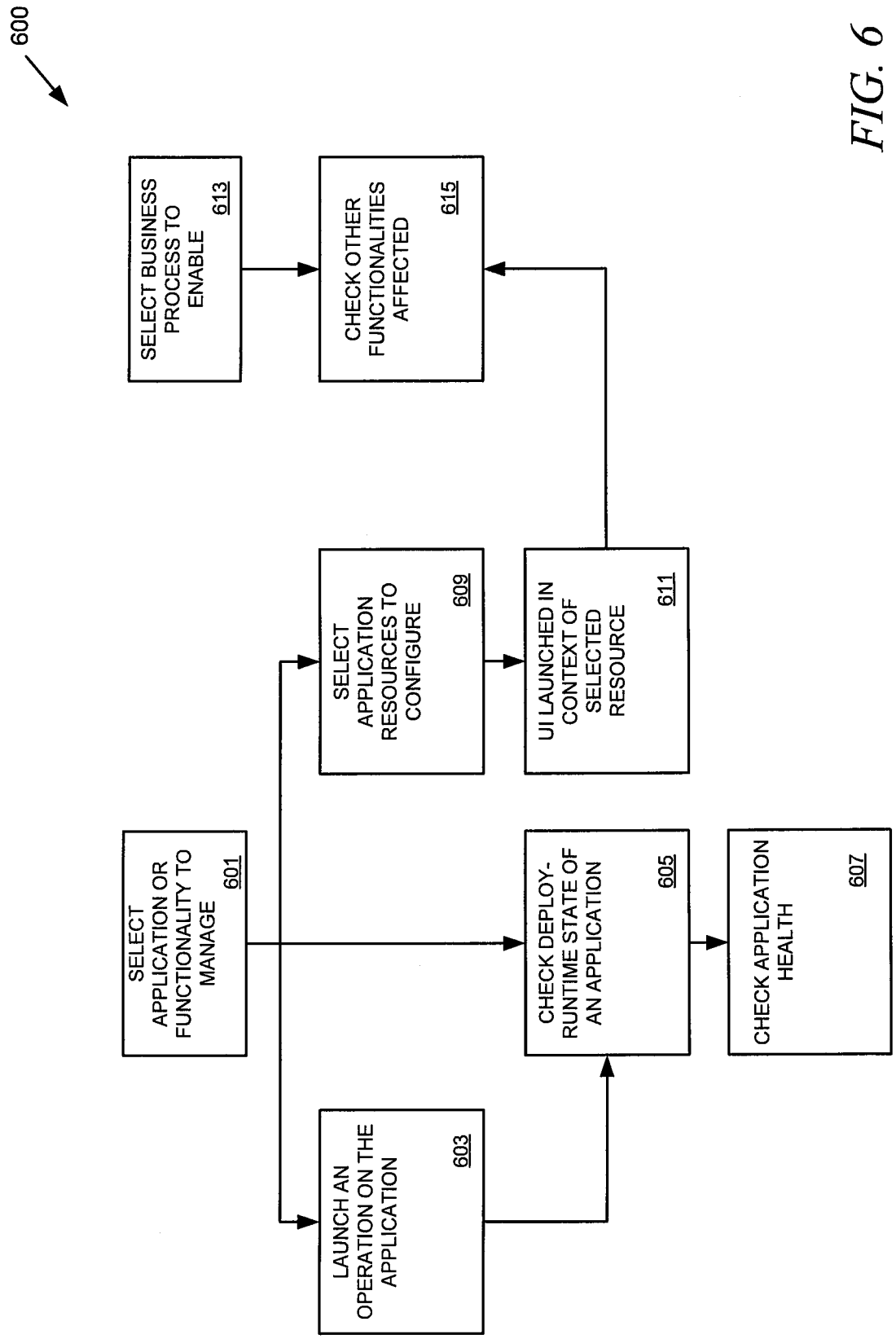
FIG. 6 is a flowchart illustrating an exemplary method to administer an application-centric resource.

With reference now to FIG. 6, an exemplary method 600 to administer an application-centric resource provides an overview of utilization of the exemplary architectural model of FIG. 5A using various techniques, components, and resources described herein. As noted with reference to FIG. 3, above, the exemplary method 600 can be implemented using various types of GUIs, touch-screens, and pointing devices, all known independently in the art.

At operation 601, a user selects an application or functionality to manage. The user can either launch an operation on the application at operation 603, check a deploy-runtime state of an application at operation 605, or select application resources to configure at operation 609. Optionally, the user can select one or more business processes to enable at operation 613. The business processes may or may not be related to a particular application.

Once an operation is launched at operation 603, the user can additionally choose to check the deploy-runtime state at operation 605. Although not shown directly, the runtime state can include viewing DC runtime states, viewing reported error or fatal traces, or viewing monitoring metrics deployed by an application or other functionality. An overall check on the health of the application or other functionality can also be selected at operation 607. The health check can be implemented in various ways including, for example, simply displaying a green, yellow, or red status flag as discussed above with regard to FIG. 3. Alternatively, a simple status check such as "enabled," "disabled," or "OK" can be displayed to the user. Additionally, the health check can also include a graphical display of monitoring counters, tests, or traces and logs of a given application or functionality. Each of the display options and associated codes for health tests is known independently in the art.

Should the user choose to select application resources to configure at operation 609, the GUI can display all configurable resources for a specific application or functionality. The user can simply select a resource, navigate to a specific configuration UI in the context of the selected resource at operation 611, and be able to graphically detect how other applications or functionalities may be affected on the overall enterprise system at operation 615. Other affected functionalities are described with reference to FIG. 5B, above. Optionally, a generic configuration tool can also be launched at operation 609. The configuration tool passes the context of the application being configured so that the generic configuration tool automatically shows only data relevant for the particular application, thus saving the user a need to know what tools are available and how to find concrete application configurations in a particular tool.

In general, the user has multiple tools to change the configuration of an AS Java® engine, such as a resource editor. Thus, when the user performs a change in the resource editor, the user can see which functionalities are potentially affected. If the user changes the parameters of, for example, a destination, the user can see a list of all functionalities which use that destination. The resource editor can also call a generic functionality which takes as input a resource (e.g., such as various editable content including connectivity, properties, configuration, and so on) and returns any potentially affected FUNs.

Therefore, while various embodiments of the inventive nature of the system and method for implementing an application-centric resource are described with reference to assorted implementations and exploitations, it will be understood that these embodiments are illustrative only and that a scope of the present inventions is not limited merely to those described embodiments. Moreover, the application-centric systems and methods described herein may be implemented with facilities consistent with any hardware system or hardware systems either defined herein or known independently in the art using techniques described herein. Many variations, modifications, additions, and improvements are therefore possible.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 7:
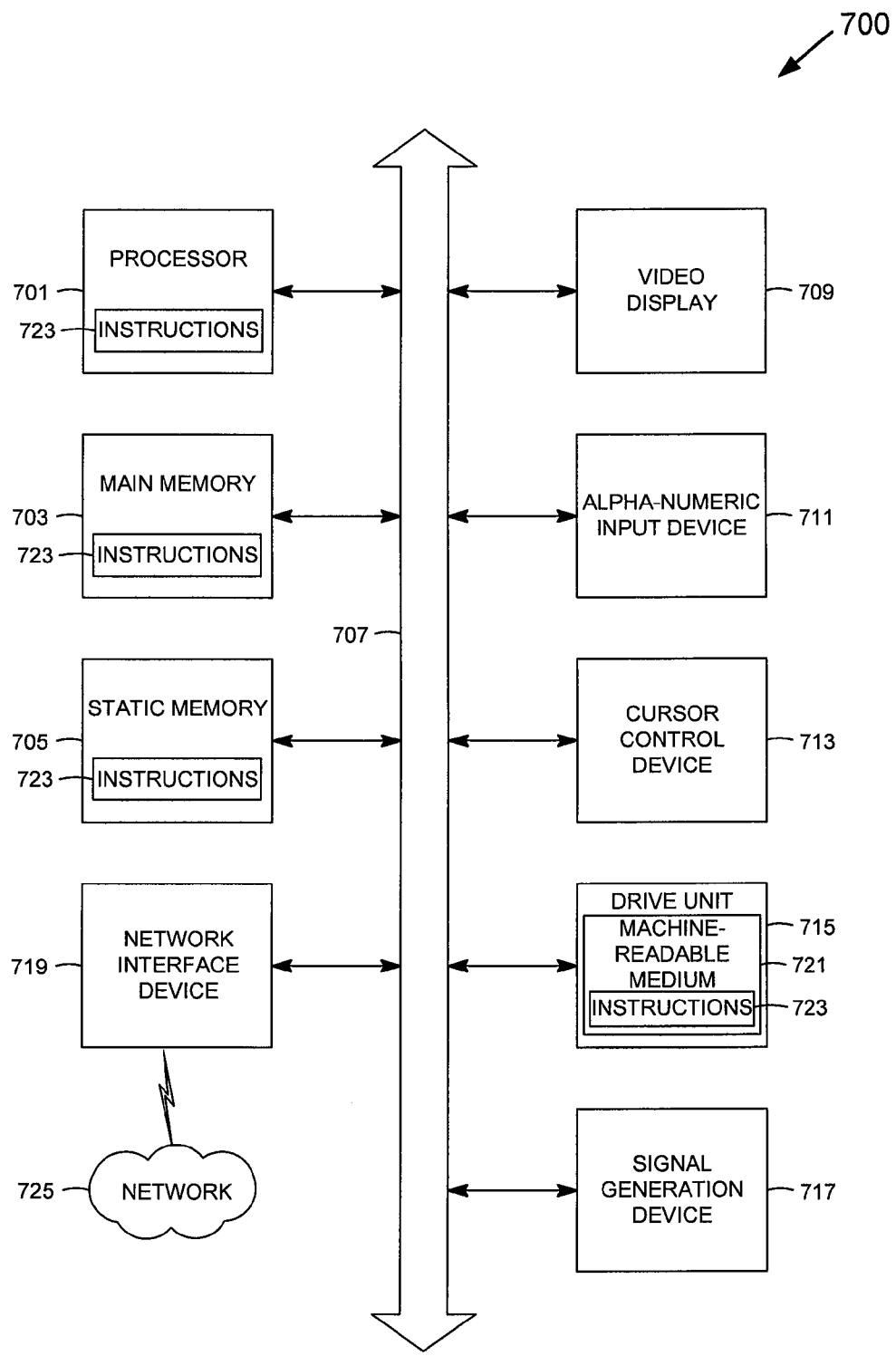
FIG. 7 is a simplified block diagram of a machine in an exemplary form of a computing system within which a set of instructions, for causing the machine to perform any one or more of the methodologies discussed herein, may be executed.

With reference to FIG. 7, an exemplary embodiment extends to a machine in the form of an exemplary computer system 700 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 701 (e.g., a central processing unit (CPU), a graphics processing unit (GPU) or both), a main memory 703 and a static memory 705, which communicate with each other via a bus 707. The exemplary computer system 700 may further include a video display unit 709 (e.g., a liquid crystal display (LCD) or a cathode ray tube (CRT)). The exemplary computer system 700 also includes an alpha-numeric input device 711 (e.g., a keyboard), a user interface (UI) navigation device or cursor control device 713 (e.g., a mouse), a disk drive unit 715, a signal generation device 717 (e.g., a speaker), and a network interface device 719.

Machine-Readable Medium

The disk drive unit 715 includes a machine-readable medium 721 on which is stored one or more sets of instructions and data structures (e.g., software instructions 723) embodying or used by any one or more of the methodologies or functions described herein. The software instructions 723 may also reside, completely or at least partially, within the main memory 703 or within the processor 701 during execution thereof by the exemplary computer system 700; the main memory 703 and the processor 701 also constituting machine-readable media.

While the machine-readable medium 721 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software instructions 723 may further be transmitted or received over a communications network 725 using a transmission medium via the network interface device 719 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. For example, although various embodiments are described in terms of a Java® server, a skilled artisan will recognize that the inventive features can be applied to other hardware and software-based systems as well. In a specific instance, the term "Mbeans" is well-known in the art. However, any concept of Mbeans can be supplemented in other non-Java environments by any resource (e.g., a hardware or software "application" that provides resource management such as, for example, getting information on and selecting applications, collecting statistics on an enterprise system, and notifying events such as faults or state changes to the enterprise system). Also, the term application can include a variety of interpretations. An application can involve a simple stand-alone tool for accomplishing a goal or can be a tool that invokes one or more development or technical components. The latter interpretation would likely most benefit from various inventive concepts discussed herein. Thus, the Detailed Description is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of the present invention is represented by the appended claims. The specification and drawings are, accordingly, to be regarded in an illustrative rather than a restrictive sense.

What is claimed is:

1. A system to provide application-centric resource management of a plurality of functional units in an enterprise environment, the system comprising:
   a memory;
   at least one hardware-based processor coupled to the memory;
   an information model repository to:
      determine relationships between each of the plurality of non-technical-functional units with one or more underlying related components;
      provide information related to each of the plurality of functional units;
      correlate each of the plurality of functional units with the one or more underlying related components based on the determined relationships; and
      determine whether each of the plurality of functional units is configured;
   a functional unit container coupled to the information model repository, the functional unit container executed by the at least one hardware-based processor to:
      generate a hierarchical structure comprising the plurality of functional units, wherein a first functional unit of the plurality of functional units is executable to perform a first action with respect to a first application, wherein a second functional unit of the plurality of functional units depends from the first functional unit according to the hierarchal structure, and wherein the second functional unit is executable to perform a second action with respect to the first application; and
      store a listing of resource services related to the plurality of functional units;
   a managed resources container coupled to the functional unit container, the managed resources container to associate each of the plurality of functional units with one or more related development components in the enterprise environment; and
   a user-interface coupled to the functional unit container to:
      allow a user to select for execution at least one operation from operations that include:
         providing to the user a plurality of operations for selection including an operation for launching one or more of the plurality of functional units;
         checking a deploy-runtime status of the one or more of the plurality of functional units; and
         selecting resources to configure on the one or more of the plurality of functional units; and
      display as a user-selectable portion of a hierarchy, the user-selectable portion including non-technical management information relating to each of the plurality of functional units as a single status indicator while hiding the one or more related development components associated with each of the plurality of functional units, the one or more related development components to be arranged in the hierarchy at levels beneath the single status indicator.

2. The system of claim 1, further comprising an application server engine.

3. The system of claim 2, wherein the functional unit container is an integral portion of the application server engine.

4. The system of claim 2, wherein the application server engine is an application server Java core.

5. The system of claim 1, wherein the information model repository is based on a common information model.

6. The system of claim 1, wherein the information related to the plurality of functional units is contained in Mbeans.

7. The system of claim 6, wherein the functional unit container is further configured to register or un-register each of the plurality of functional units through an addition or a removal of one or more Mbeans associated with each of the plurality of functional units based upon a determination of a deploy service module.

8. The system of claim 1, wherein the user-interface is configured to allow a user to manage the plurality of functional units in a graphical interface.

9. The system of claim 1, further comprising a deploy service module coupled to the functional unit container and the information model repository, the deploy service module to determine whether one or more of the plurality of functional units within the enterprise environment is added or removed.

10. A method of providing application-centric resource management of a plurality of functional units in an enterprise environment, the method comprising:
   determining whether one or more of the plurality of functional units exists within the enterprise environment;
   determining whether each of the plurality of functional units is configured;
   providing information related to the plurality of functional units;
   storing a listing of resource services related to each of the plurality of functional units;
   associating each of the plurality of functional units with one or more related development components in the enterprise environment;
   allowing a user to select at least one operation chosen from a plurality of operations that include launching one or more of the plurality of functional units, checking a deploy-runtime status of one or more of the plurality of functional units, and selecting resources to configure on one or more of the plurality of functional units;

generating a hierarchy comprising the plurality of functional units, wherein a first functional unit of the plurality of functional units is executable to perform a first action with respect to a first application, wherein a second functional unit of the plurality of functional units depends from the first functional unit according to the hierarchy, and wherein the second functional unit is executable to perform a second action with respect to the first application; and displaying, to the user, as a user-selectable portion of the hierarchy, non-technical management information relating to each of the plurality of functional units as a single status indicator while hiding the one or more related development components associated with each of the plurality of functional units, the one or more related development components being arranged in the hierarchy at levels beneath the single status indicator.

11. The method of claim 10, further comprising providing an interface to allow the user to start or stop one or more of the plurality of functional units by selecting a displayed icon.

12. The method of claim 11, further comprising providing the interface to allow the user to view any other ones of the plurality of functional units prior to selecting starting or stopping one or more of the plurality of functional units.

13. The method of claim 10, further comprising providing an interface to allow the user to view the one or more related development components associated with one or more of the plurality of functional units by selecting a displayed icon.

14. The method of claim 10, further comprising providing the information related to the plurality of functional units based on a common information model.

15. The method of claim 10, further comprising selecting the information related to the plurality of functional units to be contained in Mbeans.

16. The method of claim 15, further comprising registering or un-registering each of the plurality of functional units through an addition or a removal of one or more Mbeans associated with each of the plurality of functional units based upon a determination of a deploy service module.

17. The method of claim 10, further comprising providing an interface to allow the user to manage the plurality of functional units through a graphical interface.

18. The method of claim 10, further comprising providing an interface to allow the user to view a run-time status of one or more of the plurality of functional units by selecting an icon.

19. A computer-readable storage medium, that is not a signal, and including a plurality of instructions that, when executed by one or more processors, causes at least one of the one or more processors to perform operations to provide application-centric resource management of a plurality of functional units in an enterprise environment, the operations comprising:

determining whether one or more of the plurality of functional units exists within the enterprise environment;

determining whether each of the plurality of functional units is configured;

providing information related to the plurality of functional units;

storing a listing of resource services related to the plurality of functional units;

associating each of the plurality of functional units with one or more related development components in the enterprise environment;

allowing a user to select at least one operation chosen from a plurality of operations that include launching one or more of the plurality of functional units, checking a deploy-runtime status of one or more of the plurality of functional units, and selecting resources to configure on one or more of the plurality of functional units;

generating a hierarchy comprising the plurality of functional units, wherein a first functional unit of the plurality of functional units is executable to perform a first action with respect to a first application, wherein a second functional unit of the plurality of functional units depends from the first functional unit according to the hierarchy, and wherein the second functional unit is executable to perform a second action with respect to the first application; and displaying, to the user, as a top-level portion of the hierarchy, non-technical management information relating to each of the plurality of functional units as a single status indicator while hiding the one or more related development components associated with each of the plurality of functional units, the one or more related development components being arranged in the hierarchy at levels beneath the single status indicator.

20. The computer-readable storage medium of claim 19, wherein the operations further comprise providing an interface to allow the user to start or stop one or more of the plurality of functional units by selecting a displayed icon.

21. The computer-readable storage medium of claim 20, wherein the operations further comprise providing an interface to allow the user to view any other ones of the plurality of functional units prior to selecting starting or stopping one or more of the plurality of functional units.

22. The computer-readable storage medium of claim 19, wherein the operations further comprise providing an interface to allow the user to view a run-time status of one or more of the plurality of functional units by selecting an icon.

23. A method of providing application-centric resource management of a plurality of functional units in an enterprise environment, the method comprising:

determining relationships between each of the plurality of functional units with one or more underlying related components;

determining whether each of the plurality of functional units is configured;

correlating each of the plurality of functional units with the one or more underlying related components based on the determined relationships;

generating a hierarchical structure comprising the plurality of functional units, wherein a first functional unit of the plurality of functional units is executable to perform a first action with respect to a first application, wherein a second functional unit of the plurality of functional units depends from the first functional unit according to the hierarchal structure, and wherein the second functional unit is executable to perform a second action with respect to the first application;

storing the hierarchical structure;

providing an interface to allow a user to select at least one operation chosen from a plurality of operations that include launching one or more of the plurality of functional units, checking a deploy-runtime status of the one or more of the plurality of functional units, and selecting resources to configure on the one or more of the plurality of functional units; and displaying, to a user, one or more of the plurality of functional units as a single status indicator while hiding the one or more related components associated with each of the plurality of functional units, the one or more related components to be arranged in the hierarchical structure at levels beneath the single status indicator.

24. The method of claim 23, wherein the determining relationships between each of the plurality of functional units with the one or more underlying related components is based on a common information model.

25. The system of claim 1, wherein providing the operation for launching one or more of the plurality of functional units comprises providing a first icon for the first functional unit that is selectable to execute the first functional unit and a second icon for the second functional unit that is selectable to execute the second functional unit.

26. The system of claim 1, wherein user interface is also to filter the hierarchy to generate the user-selectable portion hierarchy based on a selection received from a user.

* * * * *